Figure 1:
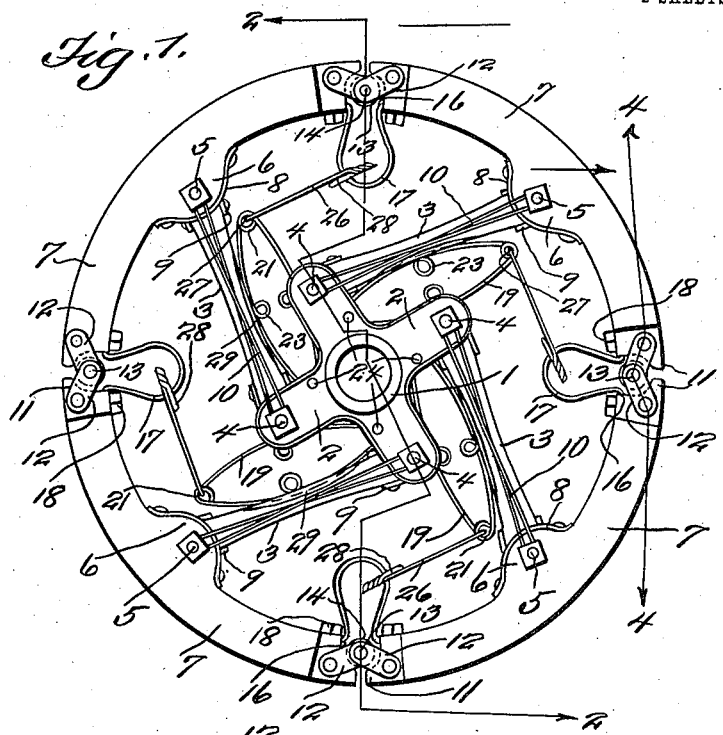

J. R. WRIGHT.
RESILIENT WHEEL.
APPLICATION FILED MAR. 2, 1912.

1,028,172.

Patented June 4, 1912.
2 SHEETS—SHEET 1.

Witnesses

Inventor
James R. Wright,
By
Attorneys

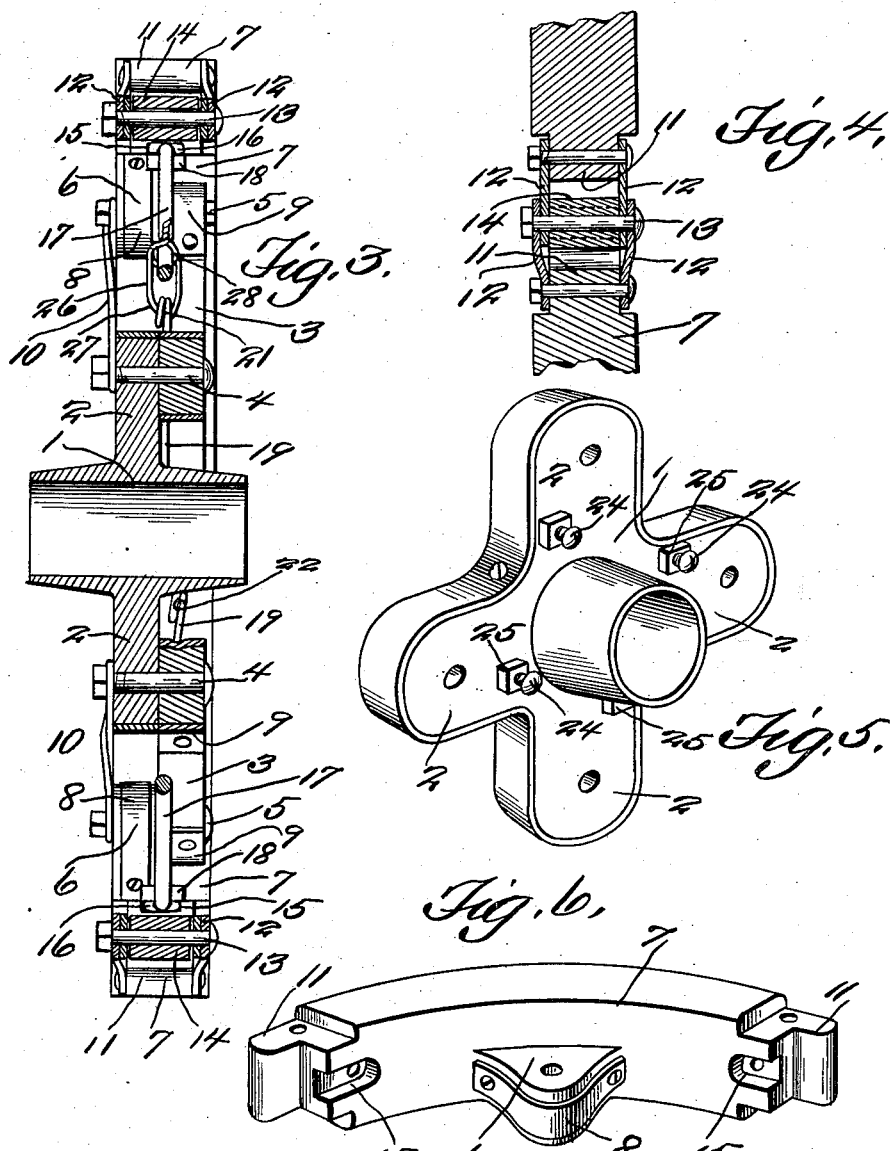

UNITED STATES PATENT OFFICE.

JAMES R. WRIGHT, OF TRENTON, MISSOURI.

RESILIENT WHEEL.

1,028,172. Specification of Letters Patent. Patented June 4, 1912.

Application filed March 2, 1912. Serial No. 681,065.

*To all whom it may concern:*

Be it known that I, JAMES R. WRIGHT, a citizen of the United States, residing at Trenton, in the county of Grundy and State of Missouri, have invented a new and useful Resilient Wheel; and I do hereby declare the following to be a full, clear, and exact description of the invention, such as will enable others skilled in the art to which it appertains to make and use the same.

This invention relates to a new and useful resilient wheel, adapted for use upon automobiles, motor-cycles, bicycles, aeroplanes, cabs, carriages, racing sulkies, and in fact all vehicles.

The invention aims as its primary object to provide an improved wheel of this nature, in which novel features of construction are involved.

The principal feature of the invention is the provision of a rim, constructed of segmental sections, coupled together in sequence.

Another feature of the invention is the production of a hub having a link connection with each segmental section, with yieldable means between each of the links, so as to render the segmental sections contractible and expansible in a resilient manner, incident to the sections coming in contact with obstructions or gullies and hills in a road bed. The yieldable means between the links are provided with connections to bowed springs, which arch the gaps between the coupled adjacent ends of the section.

A very noticeable, essential and desirable characteristic of this improved wheel is, that the hub is so arranged and connected to the links, as to avoid all direct thrusts on the hub, incident to the sections passing obstructions.

The invention comprises further features in combination of parts as hereinafter set forth, shown in the drawings and claimed.

Figure 2:
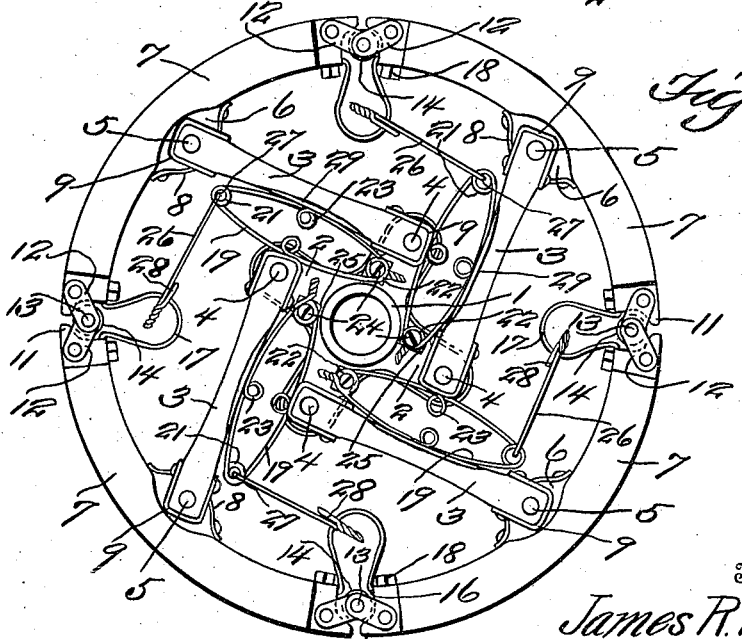

In the drawings:—Figure 1 is a view in side elevation of the improved resilient wheel. Fig. 2 is an elevation of the wheel showing the opposite side. Fig. 3 is a sectional view on line 2—2 of Fig. 1. Fig. 4 is a sectional view on line 4—4 of Fig. 1. Fig. 5 is a detail view of the hub member. Fig. 6 is a detail view of one of the segmental sections.

Referring to the drawings 1 designates the hub member having a plurality of projections 2. To each projection the inner end of a link 3 is pivoted at 4. The links extend at right angles to the projections, and their outer ends are pivoted at 5 to the ears 6 of the segmental sections 7. The ears 6 are reinforced by the metallic straps 8, while the ends of the links are reinforced by the straps 9. Also connected between the projections 2 and the ears 6 are the stay looped rods 10. The adjacent portions 11 of the segmental sections are reduced, and to the reduced portions oppositely arranged links 12 are pivoted, which links in turn are pivotally connected by the bolts 13, there being sleeves 14 surrounding the bolts. The links 12 are arranged in such manner as to permit free movements of the adjacent ends of the segmental sections. The inner faces of the sections adjacent their ends are provided with recesses 15, in which the looped ends 16 of the bowed springs 17 are arranged. These looped ends of the springs are secured in the recesses 15 by the bolts 18 and the nuts 20. The springs 17 permit the adjacent ends of the segmental sections to freely yield, expand or contract, incident to passing over an uneven road bed.

Arranged between the longitudinal side of each link and the inner end of the adjacent link are elliptical-shaped springs 19, each of which is formed with a coil at each end and in the side portions, which coils are denoted by the numerals 21, 22 and 23. The coils 23 add additional resiliency to the spring 19. Bolts 24 pass through the coils 22 and through the projections 2 of the hub, and are secured in place by the nuts 25, thereby connecting the spring 19 to the hub. A plurality of links 26 are provided, which have coils 27 and 28. The coils 27 are connected to the coils 21, while the coils 28 are received by the bowed springs 17.

The side portions of the links 3 are provided with wear plates 29, between which and the straps 9 at the inner ends of the links, the sides of the elliptical springs 19 are arranged in contact. It will be seen that when the wheel is in motion the springs 19 will expand and contract incident to the movement of the hub relative to the links, and also incident to the wheel passing over the uneven portions of the road bed. Furthermore it will be observed that by arranging the links at right angles to the projections 2, and offset from the center of the hub, the hub will be relieved of the direct thrusts. The springs 17 act to hold the adjacent ends of the sections yieldably in relation to one another.

From the foregoing it will be noted, there has been devised a novel, simple, efficient and desirable construction of resilient wheel, and one which has been found practicable.

The invention having been set forth, what is claimed as new and useful is:—

1. In a resilient wheel having a hub, a rim comprising a plurality of loosely coupled sections, links arranged at right angles to and offset from the center of the hub and connecting the sections to the hub, and bowed springs connecting the adjacent ends of the sections.

2. In a resilient wheel having a hub, a rim comprising a plurality of loosely coupled sections, links arranged at right angles to and offset from the center of the hub and connecting the sections to the hub, elliptical springs secured to the hub, one disposed between one side of each link and the inner end of the adjacent link, bowed springs connecting the adjacent ends of the section, and looped links connecting the elliptical springs and the bowed springs.

3. In a resilient wheel having a rim comprising a plurality of sections, each having reduced end extensions with undercut portions, links one pivoted upon each side of each extension, a pivot pin passing through the adjacent ends of the links from one side of the rim to the other, and a sleeve fitting each pivot pin and arranged in the undercut portions, the links extending at angles to one another toward the center of the wheel.

In testimony whereof I have signed my name to this specification in the presence of two subscribing witnesses.

JAMES R. WRIGHT.

Witnesses:
   Geo. B. Simons,
   John C. Rettich.

---

Copies of this patent may be obtained for five cents each, by addressing the "Commissioner of Patents, Washington, D. C."